United States Patent [19]

Manabe et al.

[11] Patent Number: 4,779,263
[45] Date of Patent: Oct. 18, 1988

[54] TIME DIVISION MULTIPLEXER INCLUDING A REPEATING ADAPTER

[75] Inventors: Takashi Manabe, Yokohama; Hidekazu Tsuruta, Tachikawa, both of Japan

[73] Assignee: Kabushiki Kaisha Toshiba, Japan

[21] Appl. No.: 856,059

[22] Filed: Apr. 25, 1986

[30] Foreign Application Priority Data

Apr. 25, 1985 [JP] Japan .................................. 60-89531

[51] Int. Cl.$^4$ ......................... H04J 3/02; H04Q 11/04
[52] U.S. Cl. ..................................... 370/58; 370/97; 370/112
[58] Field of Search ................. 370/97, 112, 92, 80, 370/58, 67, 68, 85

[56] References Cited

U.S. PATENT DOCUMENTS

| | | | |
|---|---|---|---|
| 3,959,596 | 5/1976 | Bojanek et al. | 370/67 |
| 4,488,290 | 12/1984 | Dunn et al. | 370/67 |
| 4,542,497 | 9/1985 | Huang et al. | 370/80 |
| 4,689,788 | 8/1987 | Wurzburg et al. | 370/67 |

*Primary Examiner*—Douglas W. Olms
*Attorney, Agent, or Firm*—Banner, Birch, McKie & Beckett

[57] ABSTRACT

A time division multiplexer includes a plurality of multiplexing units and a plurality of terminal adapters. Each multiplexing unit is connected to one or more terminal adapters by a respective bus. The time division multiplexer further includes a repeating adapter which has a memory. The repeating adapter is connected to two or more multiplexing units to be accessed for temporary storage of the data to be repeated from one to the other.

6 Claims, 11 Drawing Sheets

| ADDRESS OF MEMORY | ASSIGNED ADDRESS | |
|---|---|---|
| | SEND ADDRESS | RECEIVE ADDRESS |
| 00 | 00 | 00 |
| 01 | 01 | 01 |
| 02 | 02 | 02 |
| 03 | 02 | 02 |
| 04 | 02 | 02 |
| 05 | 03 | 03 |
| 06 | 04 | 04 |
| 07 | 05 | 0E |
| 08 | 06 | 0F |
| 09 | 07 | 07 |
| 0A | 08 | 08 |
| 0B | 09 | 09 |
| 0C | 0A | 0A |
| 0D | 0B | 0B |
| 0E | 0C | 0C |
| 0F | 0D | 0D |
| 10 | 10 | 10 |
| 11 | 80 | 81 |
| 12 | 82 | 83 |
| 13 | 84 | 85 |
| 14 | 86 | 87 |
| 15 | 88 | 89 |
| 16 | AA | AB |
| 17 | AC | AD |

FIG. 7b

| ADDRESS OF MEMORY | ASSIGNED ADDRESS | |
|---|---|---|
| | SEND ADDRESS | RECEIVE ADDRESS |
| 00 | 20 | 20 |
| 01 | 21 | 21 |
| 02 | 22 | 22 |
| 03 | 23 | 23 |
| 04 | 24 | 24 |
| 05 | 25 | 25 |
| 06 | 26 | 26 |
| 07 | 27 | 27 |
| 08 | 28 | 28 |
| 09 | 29 | 29 |
| 0A | 2A | 2A |
| 0B | 2B | 2B |
| 0C | 2C | 2C |
| 0D | 2D | 2D |
| 0E | 2E | 2E |
| 0F | 2F | 2F |
| 10 | 30 | 30 |
| 11 | 81 | 80 |
| 12 | 83 | 82 |
| 13 | 85 | 84 |
| 14 | 87 | 86 |
| 15 | 89 | 88 |
| 16 | BA | BB |
| 17 | BC | BD |

TIME DIVISION MULTIPLEXER INCLUDING A REPEATING ADAPTER

BACKGROUND OF THE INVENTION

This invention relates to a time division multiplexer capable of repeating data from one time division multiplexer to another.

A time division multiplexer is an apparatus which combines (multiplexes) and separates (demultiplexes) high speed digital data being transferred between numerous data terminals and a digital transmission line. Many kinds of data terminals may be involved, such as a PBX or a host computer.

Figure 1A:
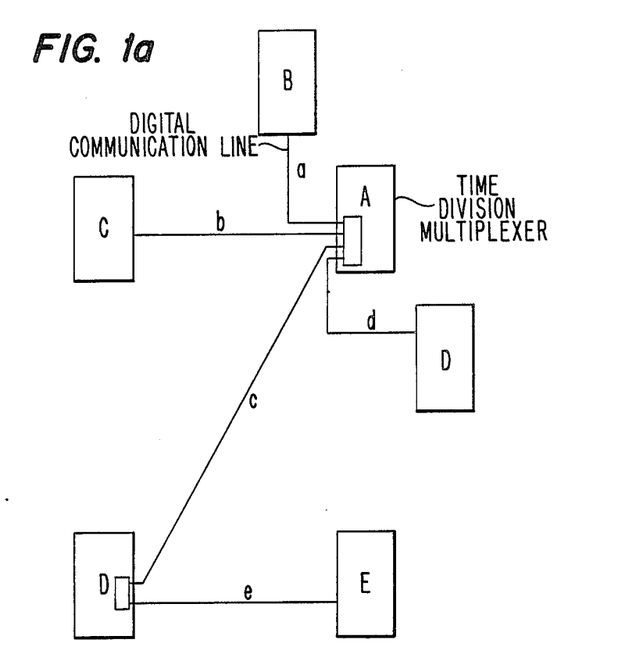
FIG. 1a shows a communication system having six time division multiplexers.

This invention concerns communication systems composed of three or more time division multiplexers. To connect each time division multiplexer to every other one by a digital transmission line is not economical because of the number (and, often, the length) of digital transmission lines involved. Generally, it requires $n(n-1)/2$ lines to connect n time division multiplexers in this manner. Consequently, it has been suggested that some time division multiplexers be connected to others only via a third multiplexer which works as a repeater, as shown in FIG. 1a. In FIG. 1a, six time division multiplexers A to F are connected by five digital communication lines a to e. Time division multiplexer A and D have a repeating function, performed by the multiplexing and repeating unit. In this system time division multiplexers B and F are interconnected only through the multiplexing and repeating unit of time division multiplexer A; similarly, multiplexers C and E are interconnected only through the multiplexing and repeating units of time division multiplexers A and D. Economical communication systems are therefore built using the repeating function.

Figure 1B:
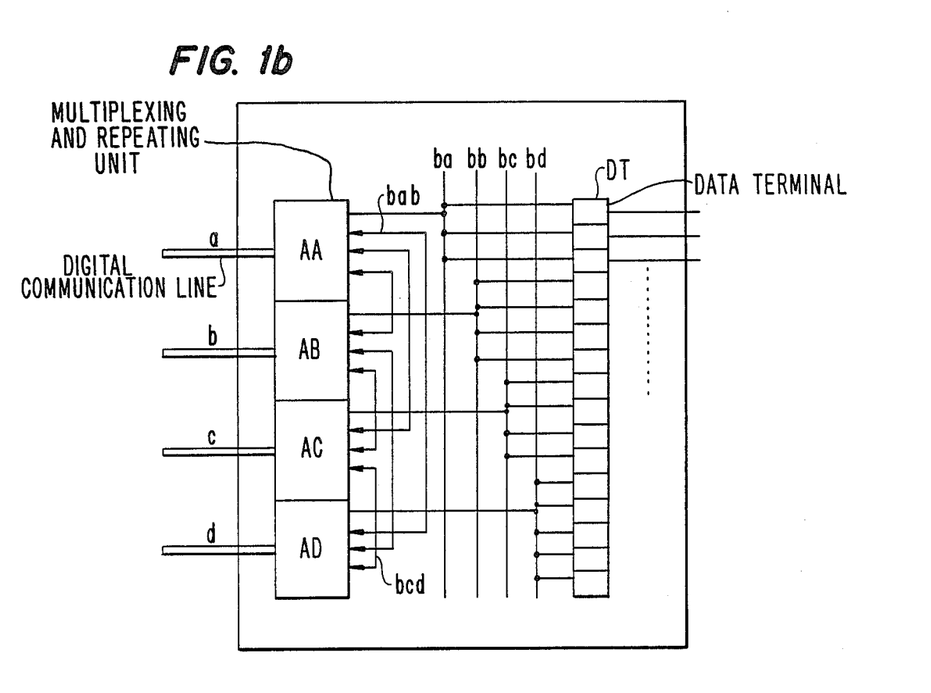

To realize this repeating function, the apparatus shown in FIG. 1b was considered by the inventors. The time division multiplexer includes four multiplexing and repeating units AA to AD. Each multiplexing and repeating unit is connected to a respective digital transmission line a to d and to a respective bus ba to bd to which a plurality of data terminals DT are commonly connected. Multiplexing and repeating units AA to AD are interconnected by repeating buses bab to bcd. Multiplexing and repeating unit AA demultiplexes the data train received from the other time division multiplexers and delivers it to their respective data terminals or to another multiplexing and repeating unit. Data delivered to unit AA is temporarily stored in its memory before being multiplexed with other data from the data terminal. The multiplexed data train is sent to other time division multiplexers.

In such a system, each multiplexing and repeating unit has to be provided with memory and with transfer switches between all of the lines and a plurality of repeating buses. Therefore, the electrical structure of each multiplexing and repeating unit is complicated. Also, it requires a large-scale change in all existing multiplexing and repeating units whenever another unit is to be added. For example, to go from three to four, first three new repeating buses are required to interconnect four units. And each multiplexing and repeating unit has to be changed as to the transfer switch functions. So, the system like that shown in FIG. 1b has less flexibility.

SUMMARY OF THE INVENTION

An object of the present invention is to provide a simplified time division multiplexer.

Another object of the present invention is to provide a time division multiplexer which, when used in a communication system with other, similar multiplexers, enables additional multiplexers to be added easily to the system.

According to the present invention, and in order to realize the above objects, a time division multiplexer is provided with a plurality of multiplexing units, a plurality of terminals adapters, and a repeating adapter. Each multiplexing unit is connected to a respective bus to which several terminal adapters are commonly connected. The repeating adapter is connected to at least two multiplexing units in the manner of time division for the temporary storage of the data to be repeated.

BRIEF DESCRIPTION OF THE DRAWINGS

FIG. 1b shows an example of a time division multiplexer applicable to the communication system shown in FIG. 1a.

DETAILED DESCRIPTION OF THE PREFERRED EMBODIMENT

Figure 2:
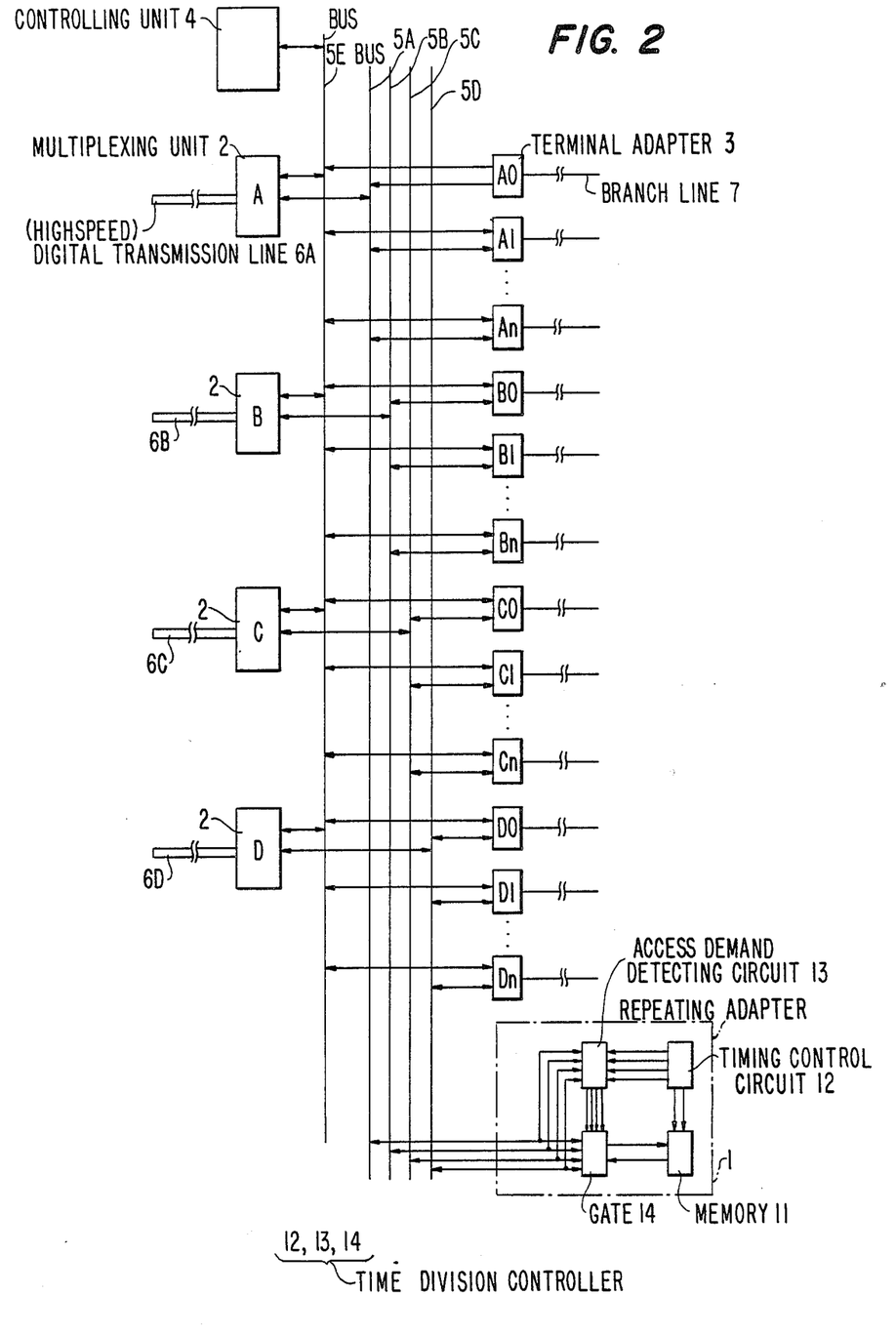
FIG. 2 is a simplified block diagram of an embodiment of the invention.

Referring to FIG. 2, time division multiplexer includes a repeating adapter 1, four multiplexing units 2A, 2B, 2C and 2D, terminal adapter 3Ao to 3Dn, controlling unit 4 and buses 5A, 5B, 5C, 5D and 5E.

Controlling unit 4 includes a Central Processing Unit CPU as described in more detail below. Controlling unit 4, which is connected to bus 5E, controls the entire time division multiplexer. Namely, controller unit 4 recognizes whether each multiplexing unit is installed or not as well as whether each terminal adapter is installed or not. Controlling unit 4 has information as to the assignment of time slots for the data to be transferred between terminals (not shown) through the terminal adapter, the multiplexing unit and those of other time division multiplexers, and as to the assignment of time slots for the data to be transferred between terminals connected to other time division multiplexers through repeating unit 1. This assignment information can be changed as required. Controlling unit 4 sends assignment information to multiplexing units 2A, 2B, 2C and 2D.

Multiplexing units 2A to 2D are commonly connected to bus 5E, and are individually connected to buses 5A to 5D and digital transmission lines 6A to 6D, respectively. Multiplexing units 2A to 2D, as described in more detail below, basically demultiplex the data train in frame format transmitted from other time division multiplexers via digital transmission line 6 (6A to 6D) and adds an address to each channel's data (according to the assignment information) so that terminal adapter 3 (3Ao-3Dn) and repeating adapter 1 can receive the data in accordance with the address. Multiplexing units 2A to 2D send these data with their addresses successively to terminal adapter 3 or repeating adapter 1 via buses 5A to 5D. Multiplexing unit 2 also sends them the address as to the data to be sent out of this time division multiplexer. Multiplexing unit 2 also basically multiplexes channel data from terminal adapters 3 and repeating adapter 1 in accordance with the address, and sends it out to respective digital transmission lines 6. Each multiplexing unit operates on the basis of its own independent clock (not shown). A more detailed description of multiplexing unit 2 will be given below.

Terminal adapters 3, each of which is connected to one of buses 5A to 5E, is also connected to the data terminal (not shown) by branch lines 7. Each terminal adapter 3 basically operates as an interface between the time division multiplexer and the data terminal. It receives only the data relevant to the connected data terminal from multiplexing unit 2, and sends the data to the data terminal; and it sends the data from the connected data terminal to multiplexing unit 2 in accordance with the address.

Repeating adapter 1 is connected to all four buses 5A to 5D. This common connection is featured in this embodiment. Repeating adapter 1 includes memory 11, timing control circuit 12, access demand detecting circuit 13 and gate 14, the latter three of which are collectively named "time division controller." Multiplexing units 2A to 2D all have access to memory 11 for the purpose of temporarily storing the data to be repeated. As described above, multiplexing unit 2 operates on the basis of its own independent clock, and it sends out channel data together with an address successively in each channel period. Therefore, in general there are four sets of data on buses 5A to 5D at the same time. The time division controller controls the actual access timing as to each multiplexing unit 2A to 2D so that access does not occur simultaneously. The time division controller also divides each access period of multiplexing unit 2A to 2D into separate periods of access for reading and writing, because, in this embodiment, only one memory is provided in repeating adapter 1.

Gate 14 accepts the data and the address to be transferred between multiplexing unit 2 and memory 11. Gate 14 is connected to buses 5A to 5D, memory 11, and access demand detecting circuit 13. Timing control circuit 12 generates timing signals for multiplexing units 2A to 2D. Access demand detecting circuit 13 detects the access demands of multiplexing units 2A to 2D one by one in accordance with the timing signals from timing control circuit 12 and controls gate 14 to pass the data and the address separately when it detects an access demand.

The data train in frame format is sent from other multiplexing units of other time division multiplexers to each multiplexing unit 2. The data train is divided into a plurality of channels of data. One of the channels may be that for the data terminal connected to terminal adapter 3A0, another may be that for the data terminal connected to terminal adapter 3A1, and others may be that to be repeated through repeating adapter 1. The assignment information as to this designation is preset in each multiplexing unit 2, by control unit 4. The channel data is output together with the address to the respective bus successively. The write signal is also output at the same time. Terminal adapters 3 and repeating adapter 1 continuously try to detect their own addresses from multiplexing unit 2. Terminal adapters 3, upon detection of their own addresses send the data to the connected data terminal. Repeating adapter 1, upon detection of its own address, stores the data temporarily. In this way, each channel's data is handled either by a terminal adapter 3 or by repeating adapter 1.

The procedure for taking data into the multiplexing unit from the terminal adapter or repeating adapter unit is as follows. Multiplexing unit 2 successively outputs the address as to the data to be sent and the read signal. As in the case of received data, each address represents the address of a terminal adapter 3 or the repeating adapter 1. Terminal adapter 3 sends the data toward multiplexing unit 2 when it detects its own address. Repeating adapter 1 also sends the data toward multiplexing unit 2 when it detects its own address. Multiplexing unit 2 takes in these data at the appropriate time and multiplexes and sends them out toward other multiplexing units of other time division multiplexers.

Figure 3:
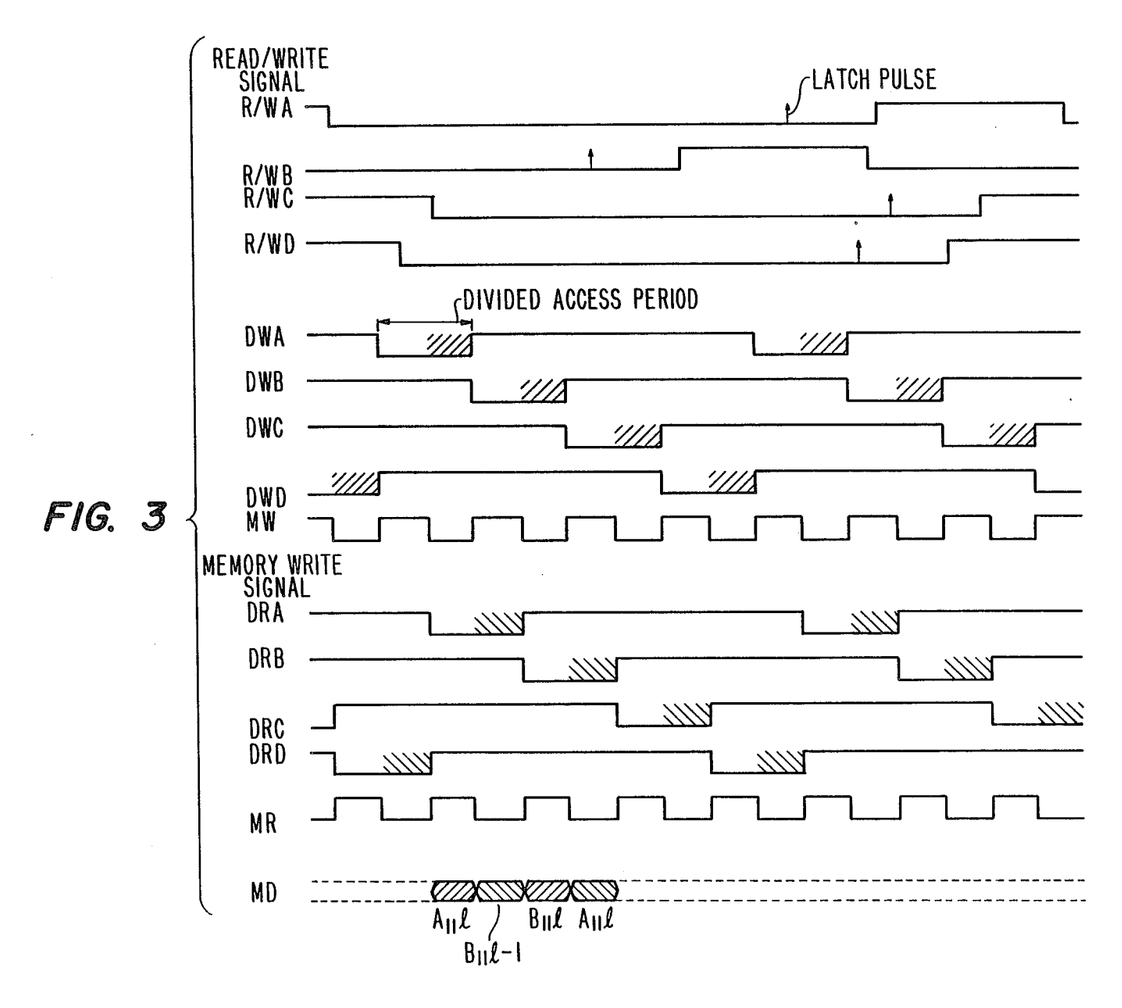
FIG. 3 is a timing chart of the embodiment shown in FIG. 2.

Next is a detailed description of the operation of repeating unit 1. Referring to FIG. 3, read/write signals (R/W·A) to (R/W·D) of multiplexing units 2A to 2D have a relatively long "low" period and another relatively short "high" period in one channel time. The "low" signal in this embodiment is active. They are generally output with no synchronism. The read signal and the write signal are to be output at different times, generally; however, as it is not important whether they are output at different times or at the same time, they are shown at the same time only for the purpose of convenience. The channel data resulting from the demultiplexing of the received data in multiplexing unit 2, and the address, are output during a period almost the same as that of the write signal; and the address as to the data to be sent out is output during a period almost the same as that of the read signal. The arrows near the end of the "low" signal periods represent latch pulses to be generated inside multiplexing unit 2 by which the data to be sent is taken into multiplexing unit 2.

Signals DWA to DWD show the access periods of the "low" signal generated from timing control circuit 12. The "low" signal access period is generated at a different time for each multiplexing unit 2. The time for one cycle of DW signals for all four multiplexing units is almost one half of one channel time. According to these time relationships, all access demands are able to be detected at least once even if two or more occur at the same time, as described in more detail below. Each access period is divided in half. The first half is used for actual detection of the access demand of multiplexing unit 2. The detected access demand is held during the second half of the divided access period. Actual access to memory 11, that is "writing", is gained during the latter half (shown by hatched lines). In this latter half the gate control signal is transmitted to gate 14 from access demand detecting circuit 13 to pass the data and the address from multiplexing unit 2 to memory 11, if the access demand has been held. The memory write signal (distinguished from the write signal of the multiplexing unit) is shown by MW. This memory write signal MW is generated in timing control circuit 12 and is led into memory 11. Memory write signal MW, which is active when "low", is applied during the latter half of the divided access period. Consequently, the data led to memory 11 is stored in that area of memory 11 designated by the address transmitted at the same time.

DRA to DRD, and MR, show the signals representing the divided access period for reading, and the memory read signal. These five signals are also generated by timing control circuit 12 and are similar to the corresponding "write" signals described above. Consequently, in the latter half of the divided access period the data is read out of that area of memory 11 designated by address transmitted at the same time. The data read out of memory 11 is delayed in time at gate 14 so as to be taken into multiplexing unit 2 at the time of the momentary latch pulses described above. In this way, all access demands for reading from all multiplexing units 2 are detected in time division fashion even if they occur at the same time.

It is noted here that the divided access periods for reading are shifted with respect to those for writing by half a period. Because of this shifting access to memory 11 is available continuously, with no idle time as shown by memory data MD in FIG. 3. Accordingly, the memory can be used at the highest efficiency.

It is supposed here that multiplexing units 2A and 2B repeat the data received in channel "11" to each other. In this case, the address for the access to memory 11 as to the data of channel "11" are given as follows. For example, the address "80" is given to multiplexing unit 2A and 2B for respective reading access and writing access, the address "81" is given to multiplexing unit 2A and 2B for respective writing access and reading access. It is further postulated that the channel times of channel "11" for both multiplexing units 2A and 2B are fortuitously parallel in time and as shown in FIG. 3, and data ($A_{11}1$) from multiplexing unit 2A is stored at address "81" in memory 11. In the next interval data $B_{11}1-1$ is read out of address "80" in memory which has been stored based on previous access of multiplexing unit 2B and is taken into multiplexing unit 2A. Next, data ($B_{11}1$) from multiplexing unit 2B is stored at address "80" in memory. In the next interval, data ($A_{11}$ 1) is read out of address "81" in memory which has been previously stored as described above, and is taken into multiplexing unit 2B. In this way, repeating is performed using only one repeating unit.

Figure 4:
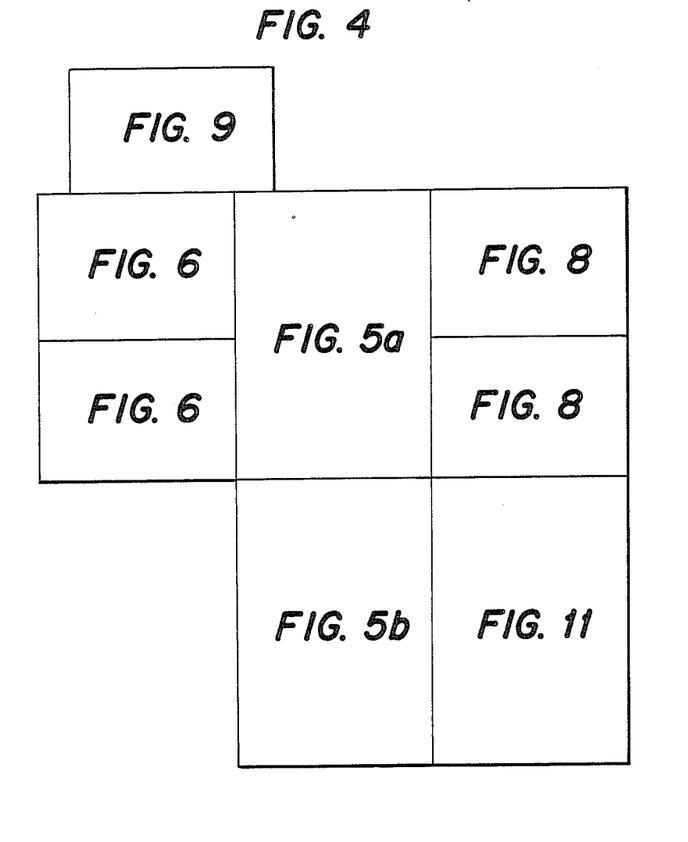
FIG. 4 shows the arrangement of FIGS. 5a, 5b, 6, 8, 9, and 11.
Figure 5A:
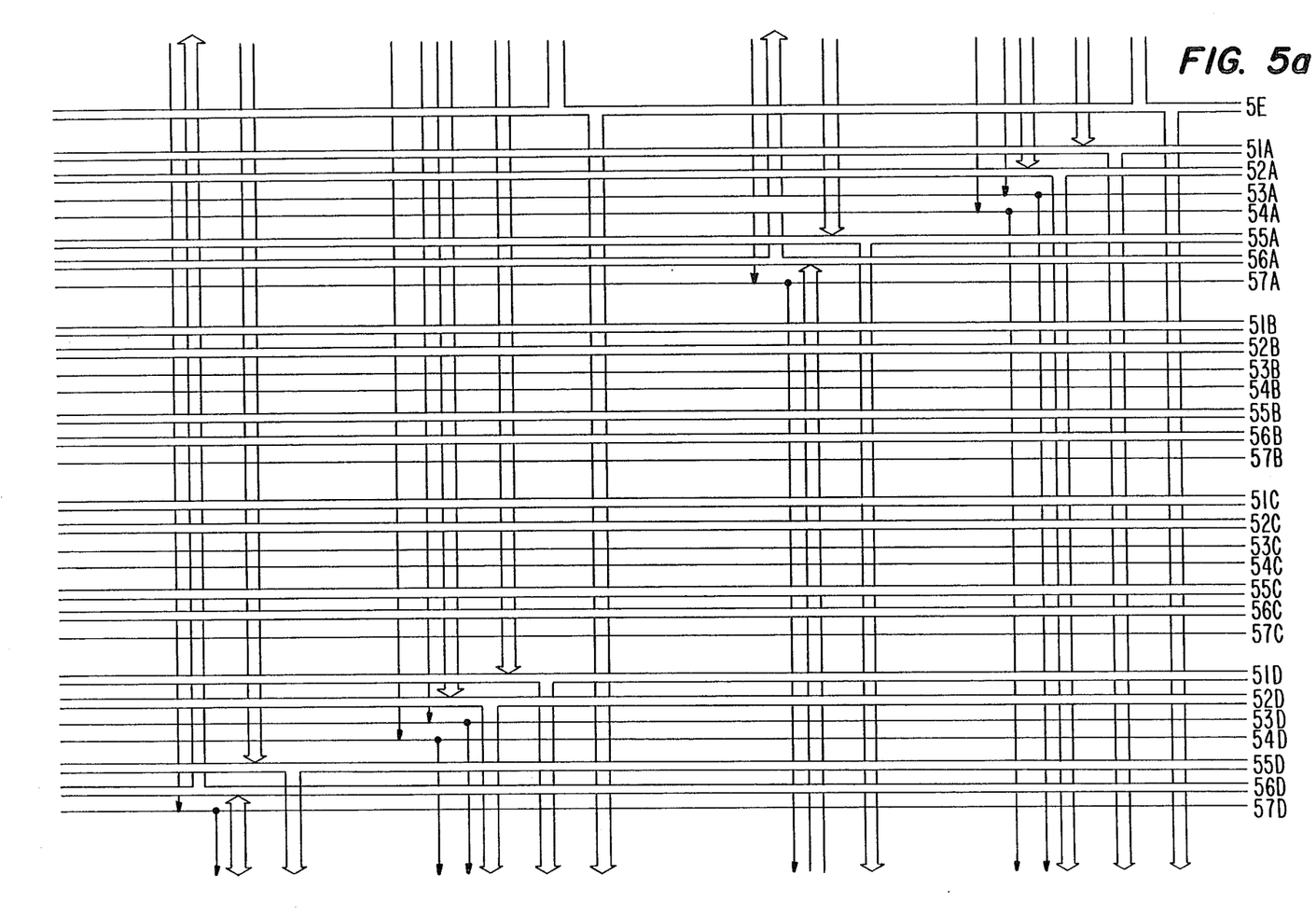
FIG. 5a and FIG. 5b respectively show in detail part of the connection lines for FIGS. 5a, 5b, 6, 8–9 and 11, the balance of the connection lines being shown in FIG. 2.
Figure 5B:
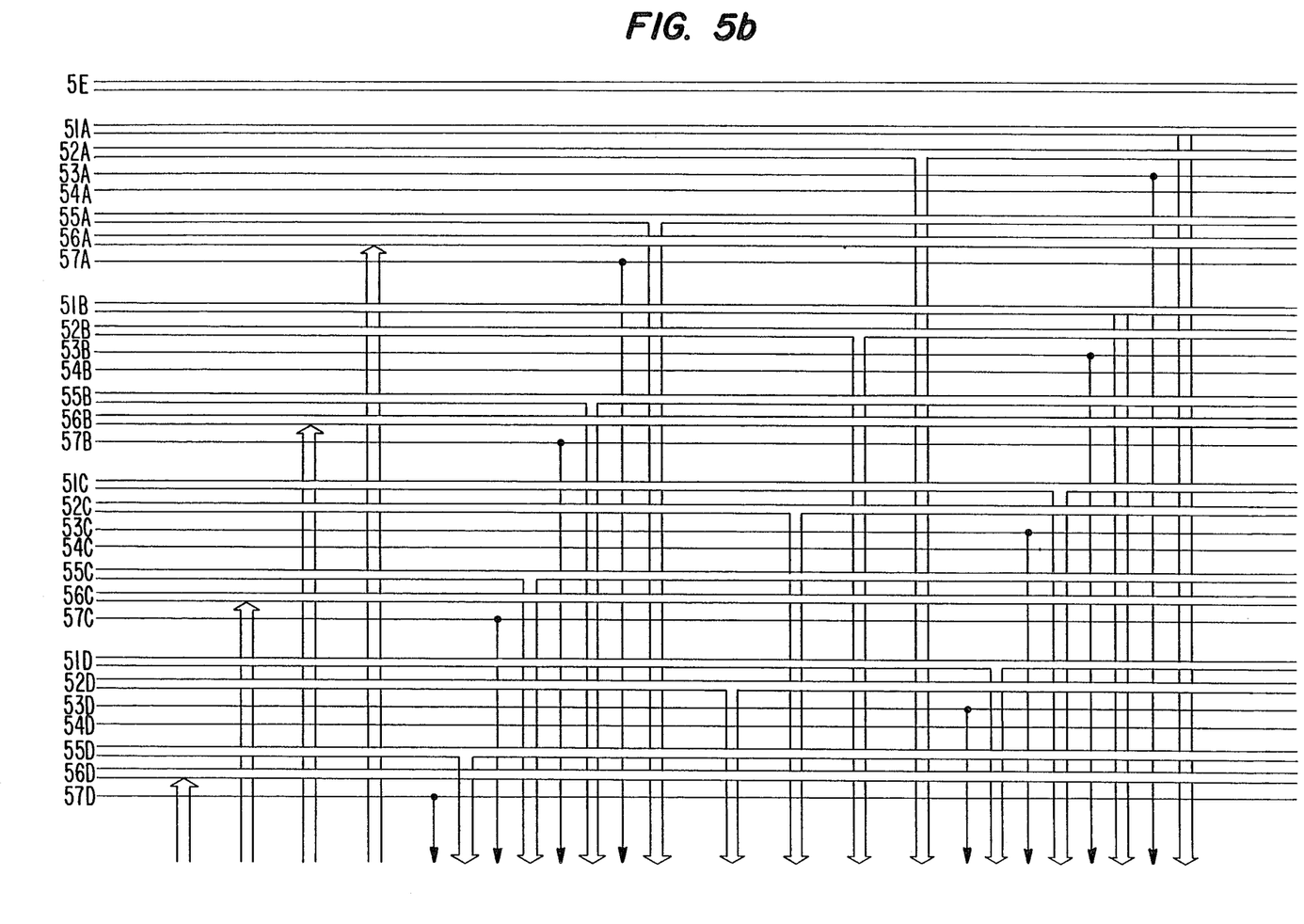

FIG. 5a and FIG. 5b together (as shown by key FIG. 4) show the buses. Each bus 5A to 5D is composed of receive address bus 51, received data bus 52, write signal line 53, clock signal line 54, send address bus 55, send data bus 56, and read signal line 57. Buses 51, 52, 55 and 56 are eight bit buses in this embodiment.

Figure 6:
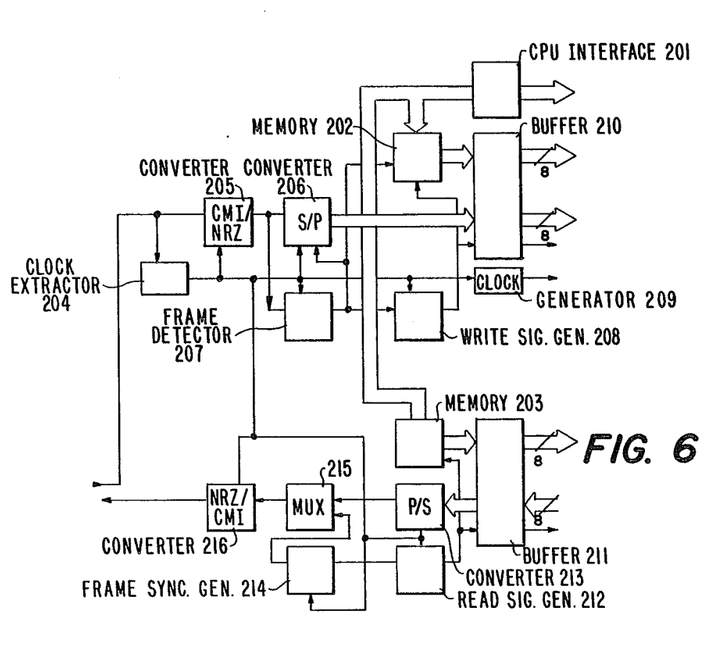
FIG. 6 is detailed block diagram of the multiplexing unit shown in FIG. 2.

FIG. 6 shows the block diagram of multiplexing unit 2. Multiplexing unit 2 includes CPU interfacing circuit 201 and memories 202 and 203. Multiplexing unit 2 has a demultiplexing portion including clock extracting circuit 204, CMI/NRZ (Coded Mark Inversion/Non-Return to Zero) converter 205, S/P converter 206, frame detecting circuit 207, write signal generator 208, clock generator 209 and buffer 210, and a multiplexing portion including buffer 211, read signal generator 212, P/S converter 213, frame synchronizing pulse generator 214, multiplexing circuit 215 and NRZ/CMI converter 216.

CPU interfacing circuit 201 connected to bus 5E includes a register to store the status of the multiplexing unit. Memories 202 and 203 are used for storing the assignment information for received data and the assignment information for the data to be transmitted, respectively. Each memory has an address counter. Before the multiplexing unit is placed in operation, the assignment data is transferred from control unit 4.

Figure 7A:
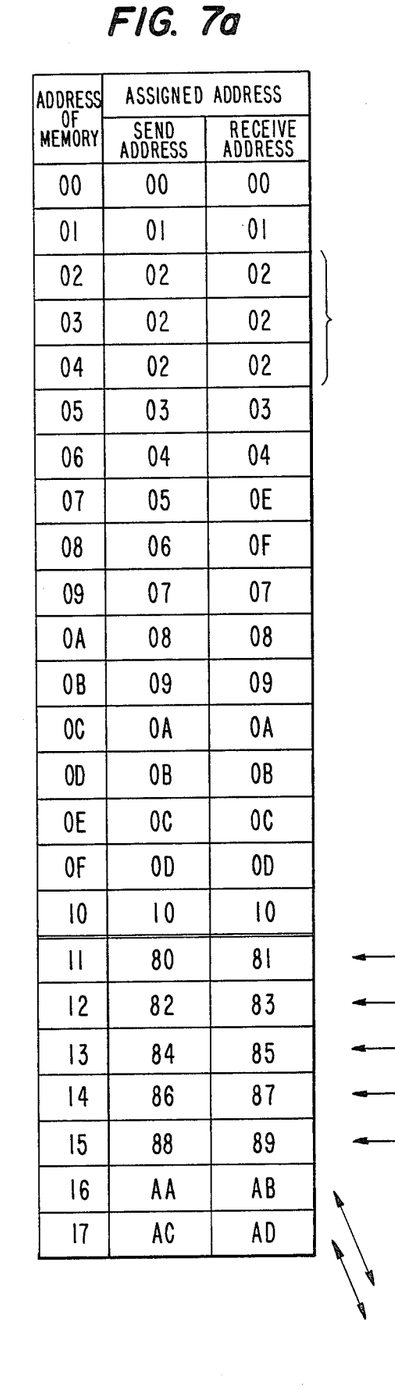
FIG. 7a and FIG. 7b respectively show assignment tables to be stored in multiplexing units 2A and 2B of FIG. 2.
Figure 7B:
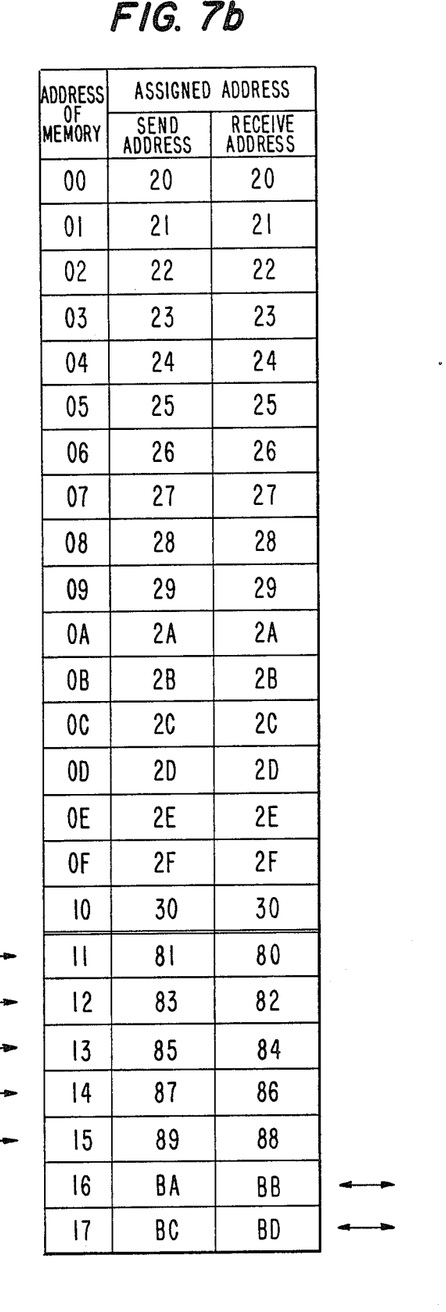

FIG. 7a shows an example of assignment information stored in memories 202 and 203 of multiplexing unit 2A, while FIG. 7b shows an example of assignment information stored in multiplexing unit 2B. In each table, the first column contains the memory address, the second column contains the address for data to be sent ("send address"), and the third column contains the address for received data ("receive address"). Numerals are in hexadecimal notation. Addresses "00" to "17" correspond to twenty-four channels "00" to "17" of each frame of the datatrain. In this embodiment, channels "00" to "10" are used for branched data terminals, and the rest "11" to "17" are used for repeating. For example, channel "00" of multiplexing unit 2A and 2B are used for data terminals respectively connected to terminal adapters 3A0 and 3B0 having an address of "00". Channels "02" to "04" of multiplexing unit 2A are used for a single data terminal handling a large quantity of data. Channels "07" and "08" are used for the data terminals doing lateral transmission. Channels "11" to "15" of multiplexing units 2A and 2B are used for repeating between the two. Channels "16" and "17" of multiplexing unit 2A are used for repeating between multiplexing unit 2A and another multiplexing unit.

When data is being received, the counter memory 206 is reset every time the frame synchronizing signal from frame detecting circuit 207 is applied, and is incremented by one every time the write signal from write signal generator 208 is applied. The data train from the digital transmission line is led into clock extracting circuit 204 and CMI/NRZ converter 205. Clock extracting circuit 204 extracts the transferring clock signal from the digital transmission line in a conventional manner. CMI/NRZ converter 205 converts a CMI coded signal to an NRZ signal. Frame detecting circuit 207 detects the frame synchronizing signal. S/P converter 206 converts the serial form of NRZ signal to the parallel form of NRZ signal separately for each channel. One channel is composed of eight bits, for example. Write signal generator 208 generates the write signal shown as R/W in FIG. 3. The counter of memory 202 is incremented by one by this write signal. Memory 202 outputs the recieve address in accordance with the number in address counter. Buffer 210 outputs the receive address, the received data and the write signal in synchronism with this write signal. For example, if the channel of the received data is "01", the receive address is "01" as seen in the assignment table. Clock generator 209 generates a clock signal to be referenced by terminal adapter 3. These receive address, received data, writing signal and clock signal are respectively led to receive address bus 51, received data bus 52, write signal line 53 and clock signal line 54.

Data transmission begins when frame synchronizing pulse generator 214 generates frame synchronizing pulse and another pulse in reference to the clock signal extracted by clock extracting circuit 204. Read signal generator 212 generates the read signal in reference to the pulse from frame synchronizing pulse generator 214 which represents memory access for reading as described before. The address counter of memory 203 is incremented by one by this read signal. Memory 203 outputs the send address in accordance with the number in the address counter. Buffer 211 outputs the send address and the read signal in synchronism with this read signal. For example, if the next channel in which data is to be sent is "01," the send address is "01" as seen in the assignment table. The send address and read signal are respectively led to send address bus 55 and read signal line 57. In response to these signals, either a terminal adapter 3 or repeating adapter 1 sends the data. The data is led into buffer 211 through send data bus 56, and is latched there by the latch pulse generated inside buffer 211. P/S converter 213 converts the parallel form of data to serial. Multiplexing circuit 215 multiplexes the frame synchronizing pulse and successive serial data. Specifically, at the beginning of the frame of the data train to be sent, multiplexing circuit 215 outputs this frame synchronizing pulse and outputs the successive channels of serial data. NRZ/CMI converter 216 converts NRZ to CMI. This CMI signal is led into digital transmission line 6.

Figure 8:
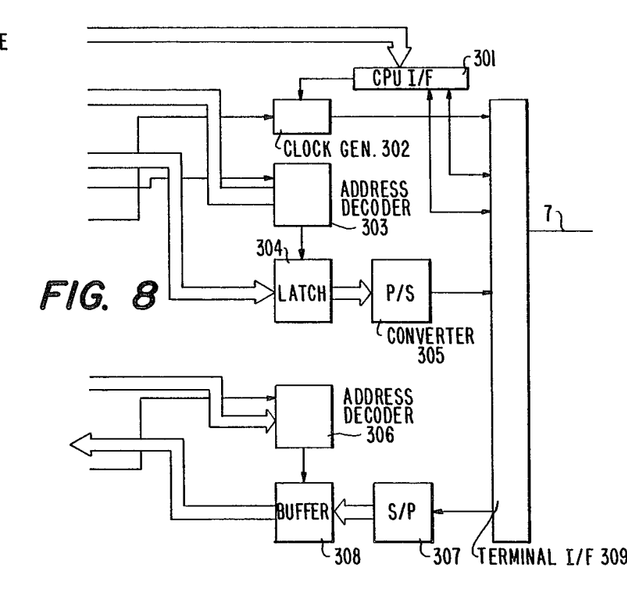
FIG. 8 is a detailed block diagram of terminal adapter 3 shown in FIG. 2.

FIG. 8 shows the block diagram of terminal adapter 3, which includes CPU interfacing circuit 301, clock generating circuit 302, address decoder 303, latch 304, P/S converter 305, address decoder 306, S/P converter 307, buffer 308 and terminal interfacing circuit 309. Terminal interfacing circuit 309 adapts the electrical condition of the data terminal to that of the time division multiplexer. There are many kinds of terminal interfacing circuits which are standardized by the C.C.I.T.T. and are selected in accordance with the data terminal to be connected. CPU interfacing circuit 301 includes a register to store information as to what kind of terminal interfacing circuit is connected and what frequency of clock is required. Clock generating circuit 302 includes a variable divider, and divides the clock from multiplexing unit 2 in accordance with the frequency information. Address decoder 303 decodes the receive address and gates the write signal in from multiplexing unit 2 when the receive address is recognized as its own address. Latch 304 latches the received data in accordance with the gated write signal. P/S converter 305 converts the parallel latched signal to serial. The serial signal is sent to the data terminal via terminal interfacing circuit 309. The data to be sent toward multiplexing unit 2 is led into S/P converter 307. S/P converter 307 converts the serial data signal to parallel. Address decoder 306 decodes the send address, and gates the read signal when the send address is recognized as its own. Buffer 308 stores the converted send data temporarily, and outputs it toward send data bus 56 at the appropriate time according to the gated write signal.

Figure 9:
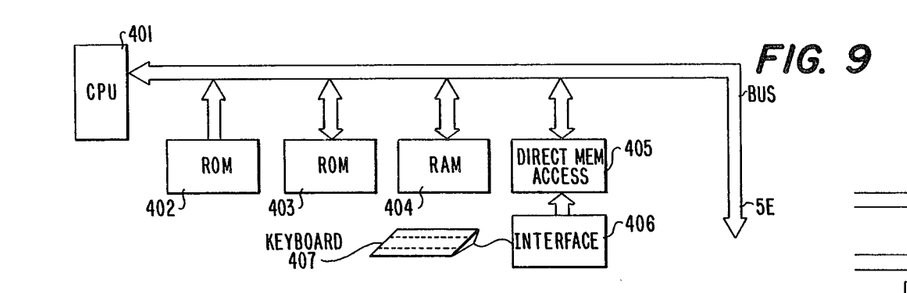
FIG. 9 is a block diagram of controlling unit 4 shown in FIG. 2.

Controlling unit 4 recognizes installation of multiplexing units 2 and terminal adapters 3 as described above, and controlling unit 4 sends assignment information representing the data addresses as described above. Controlling unit 4, as shown in FIG. 9, includes CPU 401, ROM's 402 and 403, RAM 404, direct memory access DMAC 405, interface I/F 406 and keyboard 407.

The programs stored in ROM 402 are used for executing all control processes. The assignment information currently being used and the information as to installation are stored in RAM 404. The assignment information to be used next is stored in ROM 403. ROM 403 is a rewritable memory, for example an $E^2$ or EE PROM. The assignment information is prepared whenever it is required to change the combination of communications. In case of a change, the programmer inputs the new assignment data using keyboard 407. The new assignment data is then transferred to ROM 403 through interface 1/f 406 in direct memory access by DMAC 405.

Figure 10:
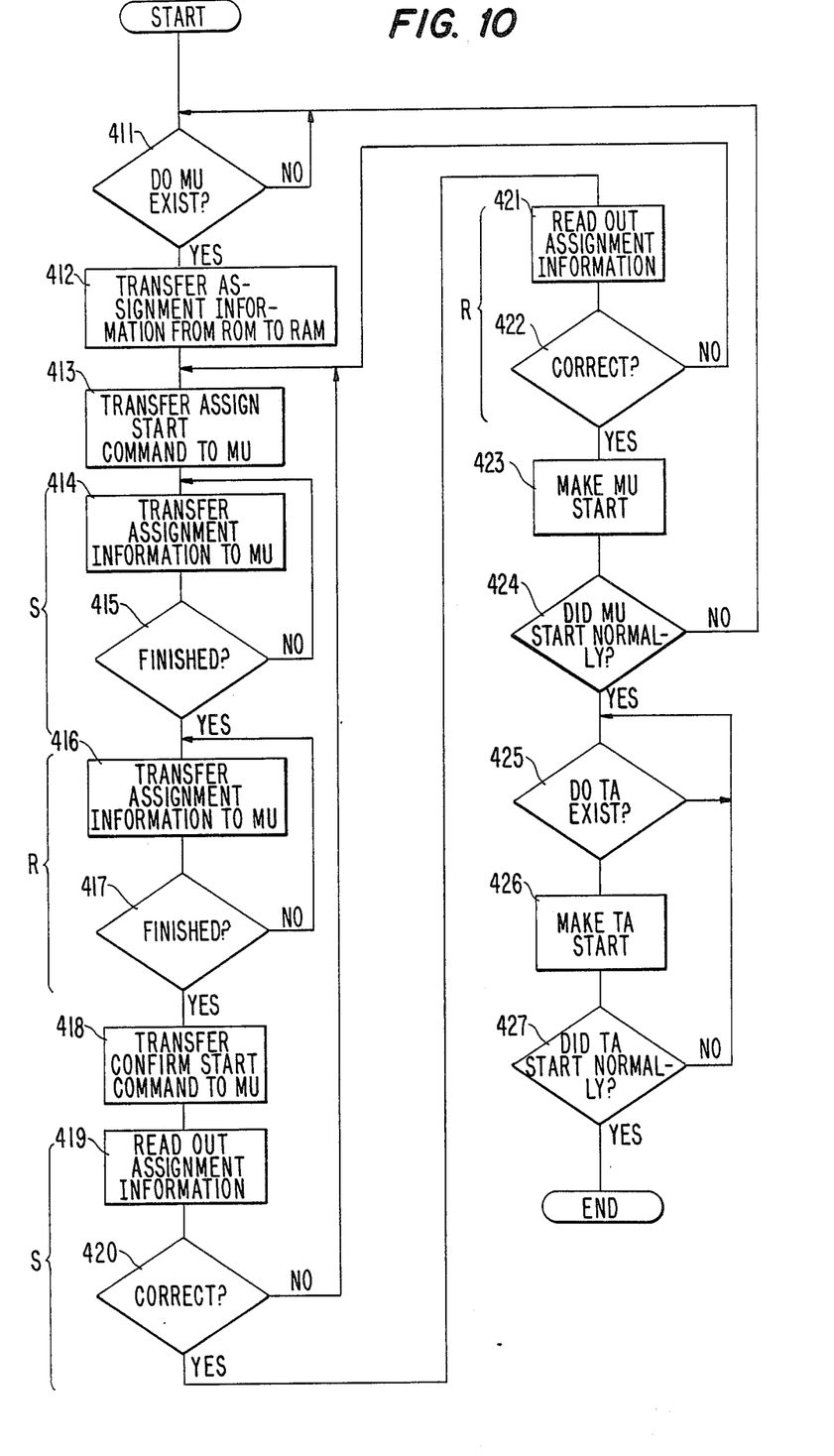
FIG. 10 is a flow chart of the process executed by CPU 401 shown in FIG. 9.

Referring to FIG. 10, CPU 401 (after initialization) first determines whether all multiplexing units 2 are installed (step 411). If there is at least one, CPU 401 next transfers the assignment information from ROM 403 to RAM 404 (step 412). Also, CPU 401 transfers the assigned start command to the multiplexing unit (step 413). In multiplexing unit 2, memories 202 and 203 clear their address counters upon receipt of the assigned start command. CPU 401 next transfers the second address shown in FIG. 7a, one by one, together with the write signal (step 414) until it finishes (step 415). The address counter of memory 202 is incremented by this write signal. Memory 202 stores the successive send addresses from control unit 4 in the locations indicated by the address counter. CPU 401 next transfers the receive addresses one by one together with the write signal (steps 416 and 417). Memory 203 stores the successive receive addresses in memory 203, whose address counter is incremented by the write signal. In this way, the transfer of assignment information from control unit 4 to multiplexing unit 2 is performed. However, CPU 401 makes confirmation of this transfer by executing steps 418 to 422. In steps 419 to 422 CPU 401 compares the address stored in memory 202 to 203 with the address stored in its own RAM 404. If an inconsistency exists, CPU 401 transfers the address again. After these confirmation steps, CPU 401 transfers a command to make multiplexing unit 2 begin operation (step 423), then it also confirms this (step 424). Next, CPU 401 determines whether each terminal adapter 3 is installed (step 425) and, if it is, causes it to start (step 426) and also confirms this (step 427).

Figure 11:
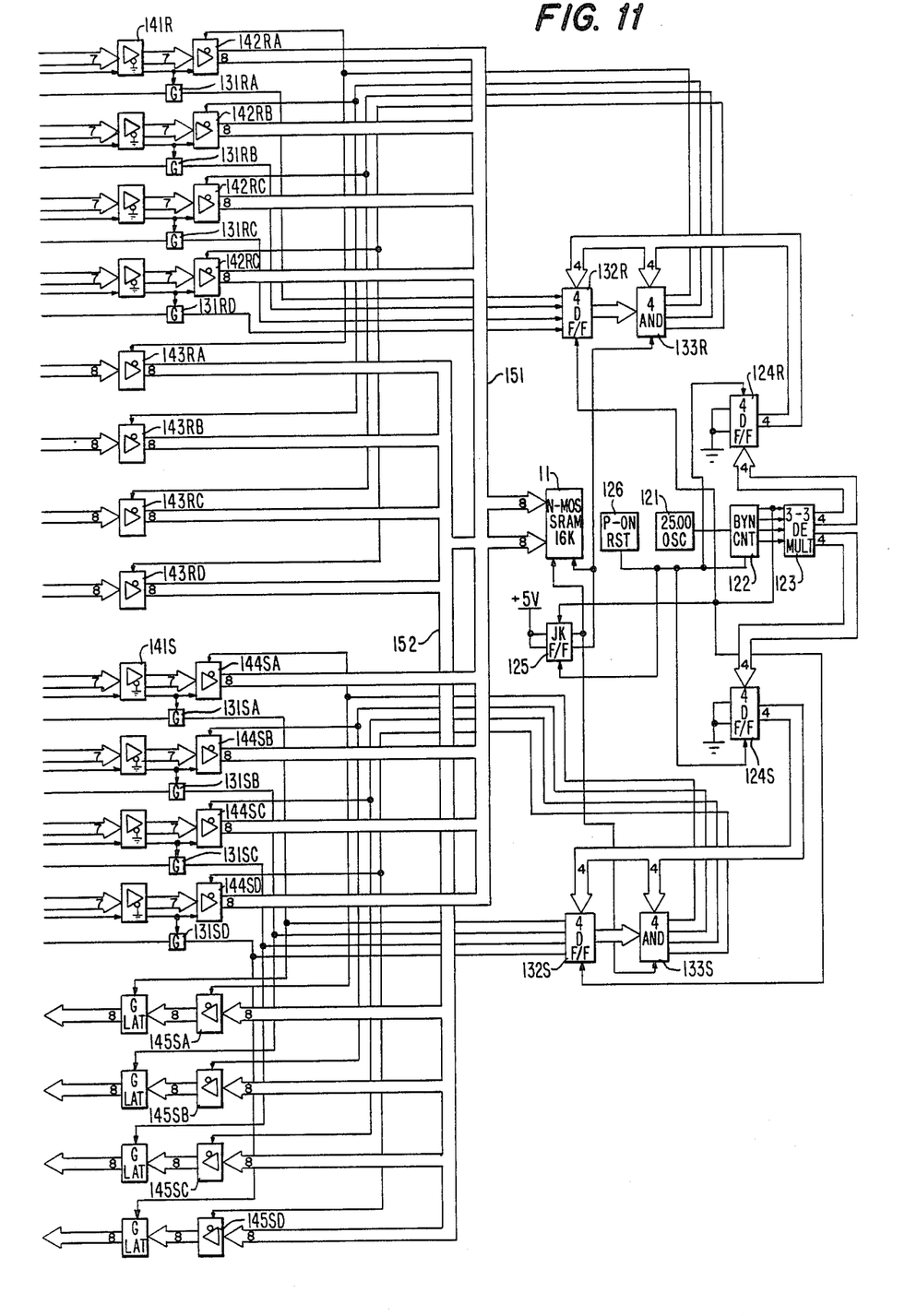
FIG. 11 is a detailed block diagram of repeating adapter 1 shown in FIG. 2.

FIG. 11 is a detailed block diagram of repeating adapter 1. Referring to FIG. 11 and FIG. 2, a static RAM is used as memory 11 due to its highspeed operation. Memory 11 has a capacity of at least 256 words, whose addresses are "00" to "FF," respectively. However, only addresses "80" to "FD" are used for temporary storage of the data to be repeated. ("FE" and "FF" are prohibited addresses.)

Figure 12:
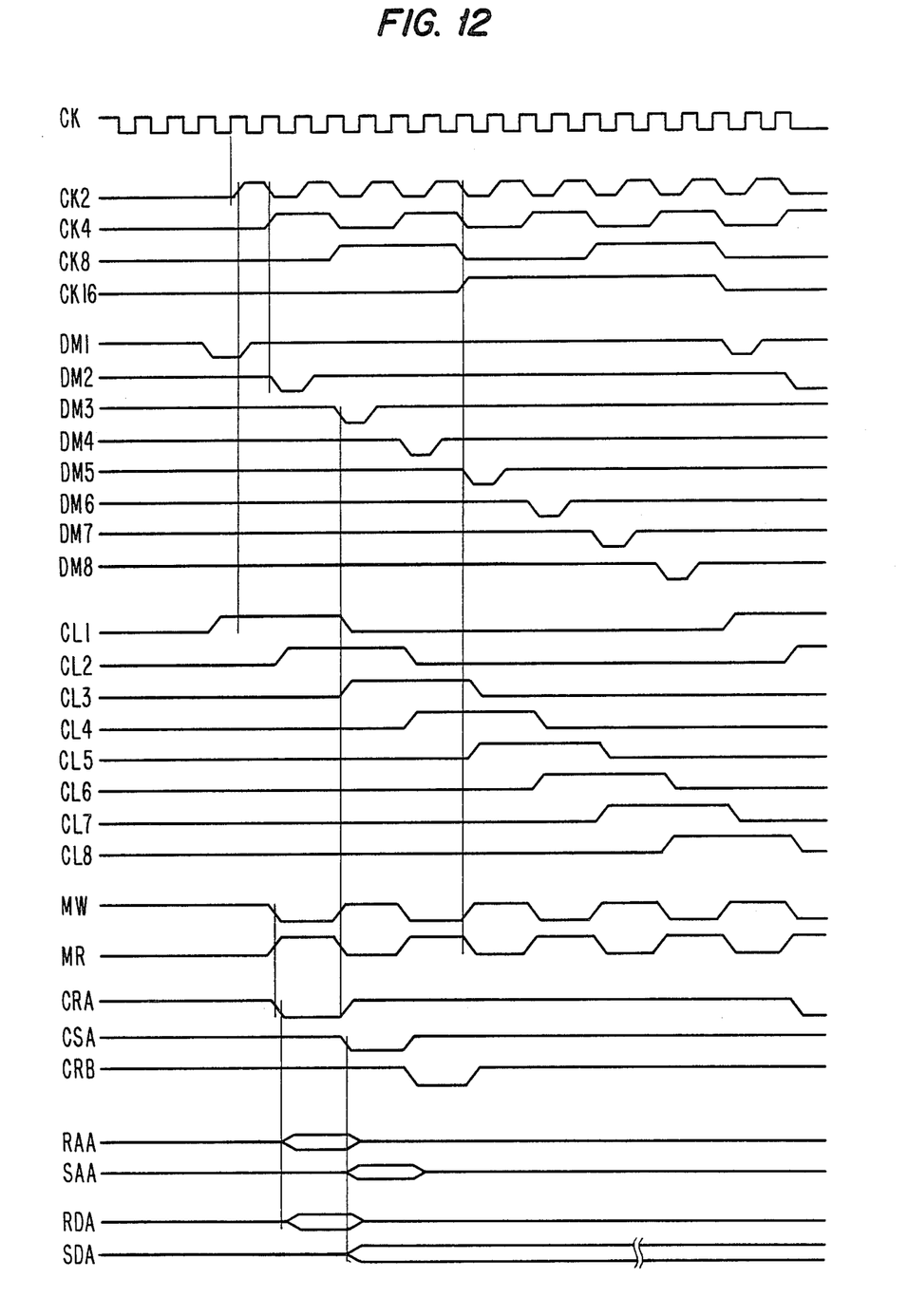
FIG. 12 is a detailed timing chart of the repeating adapter shown in FIG. 11.

Timing control circuit 12 includes oscillator 121, binary counter 122, demultiplexing circuit 123, clear signal generator 124R and 124S, memory read/write pulse generator 125, and power-on reset circuit 126. Oscillator 121 generates a basic clock frequency of 25 MHz, shown as CK in FIG. 12. Binary counter 122 is a four stage counter with taps for CK/2, CK/4, CK/8, and CK/16, as shown by CK2 to CK16 in FIG. 12. Demultiplexing circuit 123 generates eight pulse signals shifted in time with respect to each other as shown by DM1 to DM8 in FIG. 12. Odd numbered pulses are led to clear signal generator 124R, while even numbered ones are led to clear signal generator 124S. Clear signal generators 124R and 124S respectively generate odd numbered and even numbered clear signals as shown by CL1 to CL8 in FIG. 12. The former are used for clearing the old held receive access whereas the latter is used for clearing the old held send access of multiplexing unit 2. "Low" is active as the clear signal. During "high", which corresponds to the above described divided access period shown in FIG. 3, the access is detected (new or repeat) and executed. The opposite polarity between signals CL1 to CL8 in FIG. 12 and signals DWA to DWD and DRA to DRD in FIG. 3 would be understood in consideration with the above detecting operation during "high". Using a general expression, clear signal CLi is formed by signal DMi and DMi+2 from demultiplexing circuit 123, with i+2 being counted modulo 8. For example, clear signal CL1 goes to "high" when signal DM1 turns to "low", and goes to "low" when signal DM3 turns to "low". In this way, signals CL1 to CL8 corresponding to the divided access period signal are shifted by half with respect to each other. A J-K flip-flop is used as memory read/write pulse generator 125, which flips at every input of half the clock frequency. One of its two outputs is used as the memory write signal, the other being used as the memory read signal, respectively shown by MW and MR in FIG. 12. Power-on reset circuit 126 resets the indefinite circuits to coordinate their phase in an initial step such as power-on.

Access demand detecting circuit 13 includes access demand detecting gates 131RA to 131RD and 131SA to 131SD, access demand latches 132R and 132S, and gate controllers 133R and 133S. Access demand detecting gates 131RA to 131RD detect the write access demands from multiplexing units 2A to 2D by gating the respective write signal with the most significant bit MSB of the respective write address bits. Access demand detecting gates 131SA to 131SD detect the read access demands of multiplexing units 2A and 2D by gating the respective read signals with the MSB of the respective read address bits. As described above, the address "80" to "FD" are available for storing the data to be repeated in memory 11. As shown in FIGS. 7a and 7b, the addresses assigned to data to be repeated are "80" and above, whereas the addresses assigned to the data terminals are below "80". Owing to these address assignments, it is only necessary to detect the MSB of the address bits for the purpose of recognizing whether access is desired to repeating unit 1, and the circuitry for detecting access is simplified. As there is no need to have an address converter because of direct addressing, the repeating unit is also simplified.

Access demand latches 132R and 132S are provided for latching and holding the respective detected access demand. Each has four D-type flip-flops, each of which latches the read/write signal at a time synchronous with half the clock frequency from binary counter 122 in the first half of the divided access period corresponding to the first half of the high period of clear signal respectively shown by CL1 to CL8 in FIG. 12. Gate controllers 133R and 133S, each having four AND gates, generate the gate control signal in the latter half of the respective divided access period if the respective access demand has been latched and held by the appropriate D-type flip-flop of access demand latch 132R or 132S. For example, the AND gate of gate controller 132R corresponding to multiplexing unit 2A generates the gate control signal (shown by GRA) resulting from the logical AND of the held access demand, active memory write signal MW from memory read/write pulse generator 125 and the inverted signal of the clear signal CL1 from clear signal generator 124R.

Gate 14 is composed of a plurality of buffers 141R and 141S, four receive address gates 142RA to 142RD, four received data gates 143RA to 143RD, four send address gates 144SA to 144SD, four send data gates 145SA to 145SD, and four outputting latches 146. Four buffers 141 R connected to each receive address gate 142RA to 142RD are connected to the input side of receive address bus 51A to 51D, respectively. Four buffers 141S connected to each send address gate 144SA to 144SD are connected to the input side of send address bus 55A to 55D, side respectively. One bit signal of each buffer's output, which is the MSB of the receive address bits, is applied to each access demand detecting gate 131R. All 8 bits of the respective receive address are led into respective receive address gates 142RA to 142RD. To these receive address gates the respective gate control signals generated by gate controller 133R are also led. Receive address gates 142RA to 142RD gate the respective receive address in accordance with the respective gate control signal as shown by CRA, CRB or the like. On the other hand, the same gate control signals are applied to received data gates 143RA to 143RD. Received data gates 143RA to 143RD gate the respective received data in accordance with the respective gate control signals. These received address and received data are led toward memory 11 via inside address bus 151 and inside data bus 152 respectively. One bit from each output of buffer 141S, the MSB of the send address, is led into each of the other access demand detecting gates 131S. All 8 bits of the respective send address are led into the respective send address gates 144SA to 144SD, to which the respective gate control signals generated by gate controller 133S are also led. Send address gates 144SA to 144SD gate the respective send addresses in accordance with the gate control signals. For example, send address gate 144SA, which corresponds to multiplexing unit 2A, gates its send address during the period of gate control signal CSA, as shown by SAA in FIG. 12. These send addresses are successively led toward memory 11 via inside address bus 151. Synchronously with the send address, the memory read signal generated by memory read/write pulse generator 125 is applied to memory 11. Then, memory 11 reads the temporarily stored data out of the area designated by the send address. These data are output on inside data bus 152. Send data gates 145SA to 145SD gate the data in accordance with the respective gate control signals. gate control signals are also applied to the respective output latch 146. The gated data occupies too short a time period to be taken into multiplexing unit 2. Output latch 146 delays the send data in time so it may be taken into multiplexing unit 2. For example, as shown by SDA, the send data for multiplexing unit 2A is extended by the corresponding output latch.

The multiplexing unit used with this invention can be simplified because it needs no repeating circuit. The repeating adapter may be considered as a terminal adapter for the multiplexing unit, because the multiplexing unit only has to output the address and data to whichever bus it gains access to. In case it is desired to add a time division multiplexer to the communication system, it is easily done. It is assumed here that a time division multiplexer includes three multiplexing units, and three sets of buses. In this case, one new multiplexing unit and only one set of buses have to be added, the bus connections being made between the controlling unit and the repeating adapter.

While in the foregoing specification, a few embodiments of the invention have been set forth for purposes of making a complete disclosure, it will be apparent to those skilled in the art that numerous changes may be made without departing from the spirit and principles of the invention.

We claim:

1. A time division multiplexer for conveying information among a plurality of terminals and a plurality of transmission lines, said time division multiplexer comprising:

a plurality of multiplexing units, each of said multiplexing units being connected between one of said transmission lines and said plurality of terminals to combine information from said terminals for transmission in time division multiplexed form on said transmission line to said terminals;

time division multiplex control means connected to said multiplexing units for controlling the time at which information is combined from and distributed to said terminals;

a repeater memory to which at least two multiplexing units have common access for temporary storage of information to be repeated from one of said transmission lines to another; and time division access control means for permitting said at least two multiplexing units to access said repeater memory in time division.

2. The time division multiplexer of claim 1 wherein said time division access control means comprises:

a gate to transfer information between said repeater memory and said at least two multiplexing units;

an access demand detecting circuit connected to said gate and to said at least two multiplexing units to detect demands by said units for access to said repeater memory and to control said gate to transfer information in accordance with a timing signal; and a timing control circuit to generate the timing signal.

3. Time division multiplexer for conveying information among a plurality of terminals and a plurality of transmission lines, said time division multiplexer comprising:

a plurality of multiplexing units, each of said multiplexing units having a multiplexer memory to store time division multiplex assignment data representing a relationship of channels of time division multiplex information and addresses to and from which each channel of information is distributed and collected, and being coupled to and between one of said transmission lines and said plurality of terminals to combine information from said terminals for transmission in time division multiplexed form on said transmission line and to distribute information from said transmission line said terminals in accordance with the stored assignment data;

time division multiplex control means coupled to said multiplexing units for providing said multiplexing units with the time division multiplex assignment data;

a repeater memory to which said at least two multiplexing units have common access for temporary storage of information to be repeated from one of said transmission lines to another;

a gate to transfer information between said repeater memory and said at least two multiplexing units;

an access demand detection circuit coupled to said gate and to said at least two multiplexing units to detect demands by said units for access to said repeater memory and to control said gate to transfer information in accordance with a timing signal; and a timing control circuit to generate the timing signal.

4. The time division multiplexer of claim 3 wherein said access demand detection circuit detects demand during the period when said gate is transferring information.

5. The time division multiplexer of claim 3 wherein each of said at least two multiplexing units outputs send and receive addresses to said repeater memory in accordance with the stored assignment data, wherein the receive address outputted by one multiplexing unit is identical to the send address outputted by the other when information is repeated from one to the other, said send and receive addresses directly designating an address in said repeater memory, and wherein said access demand detection circuit gates and outputs the addresses towards said repeater memory in time division in accordance with the timing signal generated by said timing control circuit.

6. A time division multiplexer for conveying information among a plurality of terminals and a plurality of transmission lines, said time division multiplexer comprising:

a plurality of multiplexing units, each of said multiplexing units having a memory to presetably store address assignment data, and each of said multiplexing units being connected between one of said transmission lines and said plurality of terminals to combine information from said terminals for transmission on said transmission line and to distribute information from said transmission line to said terminals in accordance with the stored address assignment data;

repeater memory means, coupled to said at least two multiplexing units to permit said multiplexing units to have common access thereto, for temporarily storing information to be repeated from one of said transmission lines to another;

gate means for transferring information between said repeater memory means and said at least two multiplexing units;

access demand detection means coupled to said gate means and to said at least two multiplexing units for detecting demands of said units for access to said repeater memory and for controlling said gate means to transfer information in accordance with a timing signal; and timing control means for generating the timing signal.

* * * * *